United States Patent [19]

Gartland

[11] Patent Number: 4,853,062

[45] Date of Patent: Aug. 1, 1989

[54] METHOD FOR THE PRODUCTION OF WOOD PANELS

[76] Inventor: Matthew Gartland, Raharney, Mullingar, County Westmeath, Ireland

[21] Appl. No.: 151,189

[22] Filed: Feb. 1, 1988

[30] Foreign Application Priority Data

Feb. 2, 1987 [IE] Ireland ........................................ 265/87

[51] Int. Cl.⁴ ......................... B32B 31/10; B32B 31/20

[52] U.S. Cl. ........................................ 156/219; 144/350; 144/351; 156/220; 156/257; 156/297

[58] Field of Search ......................... 144/349, 350, 352; 156/219, 220, 257, 297

[56] References Cited

U.S. PATENT DOCUMENTS 1,866,312 7/1932 Loetscher ........................... 156/220
2,381,134 8/1945 Newmark ........................ 144/352 X

FOREIGN PATENT DOCUMENTS 3011171 10/1981 Fed. Rep. of Germany ...... 144/352

OTHER PUBLICATIONS

Charles H. Hayward, *Practical Veneering,* London–1949, pp. 73–78 (Card #TS870H3).

*Primary Examiner*—Robert A. Dawson
*Attorney, Agent, or Firm*—Birch, Stewart, Kolasch & Birch

[57] ABSTRACT

A method for producing a simulated framed solid wood panel comprises providing a one-piece panel element and covering at least one major surface of the panel element with a plurality of veneer elements. Each veneer element has a visible grain pattern and at least some of the veneer elements are orientated with their grain patterns at an angle to the grain patterns of immediately adjacent veneer elements. The veneer elements orientated as above are intimately bonded to the said surface to form the panel member, whereby the visible lines between adjacent bonded veneer elements simulate the appearance of joints between solid wood components.

9 Claims, 5 Drawing Sheets

METHOD FOR THE PRODUCTION OF WOOD PANELS

BACKGROUND OF THE INVENTION

The present invention relates to a method for the production of simulated framed solid wood panels.

Heretofore, the method for the production of wood panels such as frame raised or flat panel cabinet doors, wall and ceiling panelling, doors etc. employed the principle of using a solid wood frame consisting of solid wood components disposed transversely relative to each other and having a solid wood infill centre panel. It is also known to use low grade timber, chipboard or medium density fibre board wrapped with foil or wood veneer as frame elements with an infill centre panel also wrapped with foil or wood veneer.

Significant disadvantages in the production or such wood panels include the relatively high cost and the time required to produce them.

A further significant disadvantage of the known wood panels referred to above relates to the method of assembly of the components thereof. The joints and grooves necessary for the fabrication of, for example, the frame elements into a completed panel constitutes possible unhygenic conditions particularly when the panel is used in, for example, a kitchen or living room. It has been found, for example, that in an environment of relatively high humidity of air, i.e. a kitchen, the joints and grooves of the fabricated panel exhibit a tendency to pick up and retain dirt and/or moisture therein. It will be appreciated that a kitchen environment has a regular humidity cycle due to work carried out in the kitchen - when one is cooking a high humidity environment is common and when one is not cooking a much lower humidity environment is experienced. Consequent upon such a humidity cycle the wood of a fabricated frame tends to expand and contract causing in turn the wood elements of the panel to move relative to each other which causes the joints to open and close. While the relative movements of the wood elements are very small the joints do open sufficiently to accept house dirt. Also once dirt gets into and is retained in the joints it is very difficult to clean the dirt out of the joints. Further the dirt in the joints will also tend to hold the joints in an open position making it easier for the joints to receive in more dirt.

SUMMARY OF THE INVENTION

It is an object of the present invention to overcome these problems.

The invention therefore provides a method for producing a simulated frame solid wood panel, comprising the steps of providing a one-piece panel element, covering at least one major surface of the panel element with a plurality of veneer elements, each veneer element having a visible grain pattern and at least some of the veneer elements being orientated with their grain patterns at an angle to the grain patterns of immediately adjacent veneer elements, and intiminately bonding the veneer elements to the said surface to form the panel member, whereby the visible lines between adjacent bonded veneer elements simulate the appearance of joints between solid wood components.

Preferably, the method includes the step of overlapping one or more adjacent veneer elements prior to bonding.

Preferably, the method includes the step of compression moulding, embossing or routing the panel so as to produce a decorative shape with chamfered sides.

Preferably, the decorative shape essentially comprises a circumferential depression having chamfered side walls, which depression is in parallel spaced apart relationship relative to the sides of the panel element and which depression together with the veneer elements provide for a carved wood panel effect in the panel.

Preferably, the method includes a step of applying an adhesive to the veneer elements prior to bonding.

Preferably, the bonding operation is carried out using compression moulding or embossing apparatus to apply pressure to the veneer elements to secure the veneer elements in desired position on the panel element.

Preferably, the panel element comprises a low grade wood, chipboard or medium density fibre board or the like and the step of routing the panel element removes the relatively hard outer layer of the panel element thereby exposing the relatively soft substrate thereof, which facilitates the compression of the overlapping portions of the veneer elements into the soft substrate when pressure is applied to the veneer elements to secure the veneer elements onto the panel element.

DETAILED DESCRIPTION OF PREFERRED EMBODIMENT

The invention will be understood in greater detail from the following description of a preferred embodiment thereof given by way of example only and with reference to the accompanying drawings in which.

Figure 1:
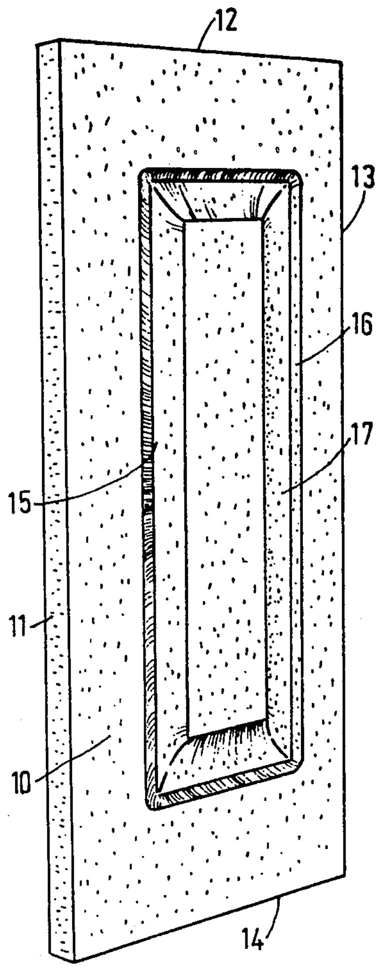
FIG. 1 is a perspective view of a panel element for use in the method according to the invention.
Figure 2:
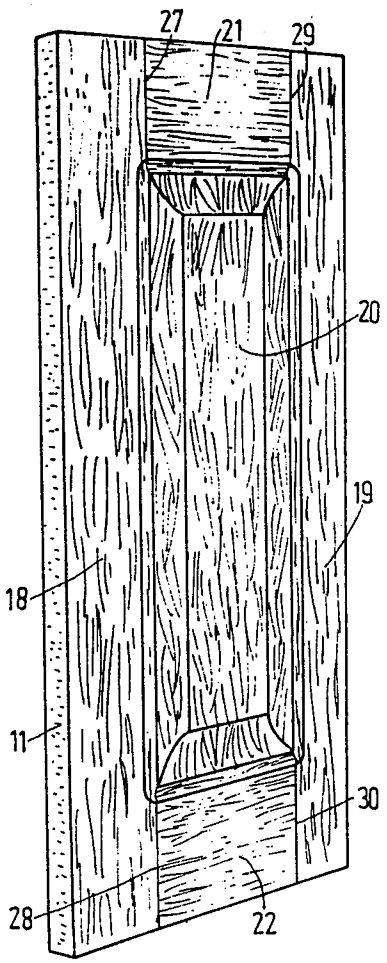
FIG. 2 is a perspective view of a panel produced by the method according to the invention.
Figure 3:
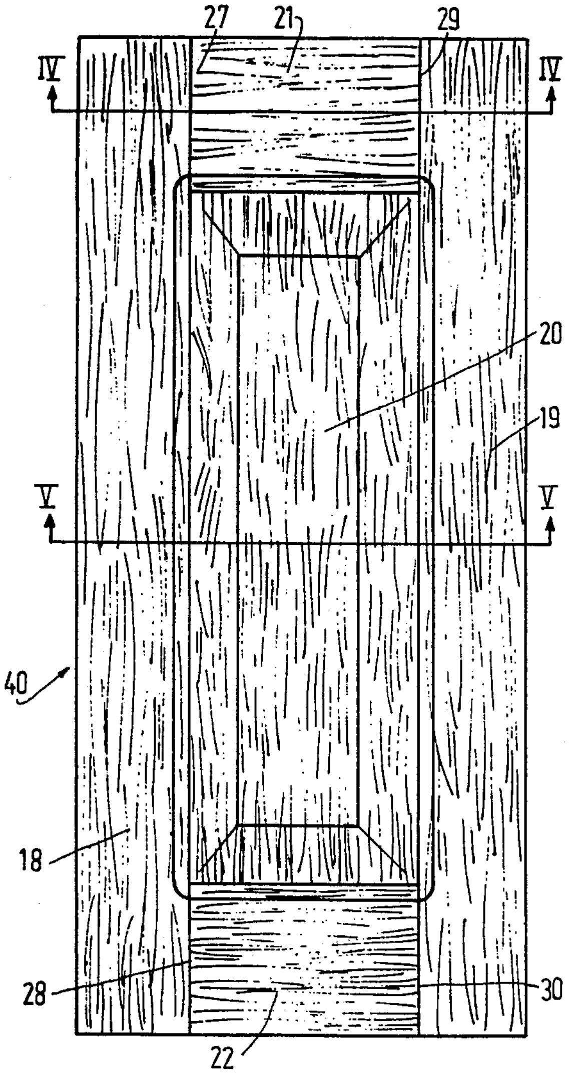
FIG. 3 is a plan view of the panel of FIG. 2 of the drawings.

Referring now to the drawings, there is shown a panel element 10 made from a low grade wood, chipboard or medium density fibre board or the like; which is of one-piece solid construction; and which is substantially rectangular in shape having edges 11,12, 13 and 14 and opposite major surfaces of which only one such surface is shown in FIG. 1. A closed continuous substantially rectangular circumferential depression 15 is initially produced by routing or otherwise selectively recessing the major surface of the original flat panel element (not shown), the edges of the depression 15 being in parallel spaced-apart relationship to respective edges of the element 10. The outer peripheral sides 16 of the recess 15 are formed with an ogee moulding. The inner peripheral sides 17 of the recess 15 are formed with a chamfered slope inclined upward from the inner end of the ogee moulding on the sides 16 to a central plateau area 10a formed by the routing out of the continuous depression or recess 15 in the panel element 10. Routing the flat panel element removes the relatively hard outer layer of the element and exposes the relatively soft substrate thereof.

It will be understood that the depression 15 is but one example of any desired decorative shape which can be formed by selectively recessing the major surface of the panel element 10.

Figure 6:
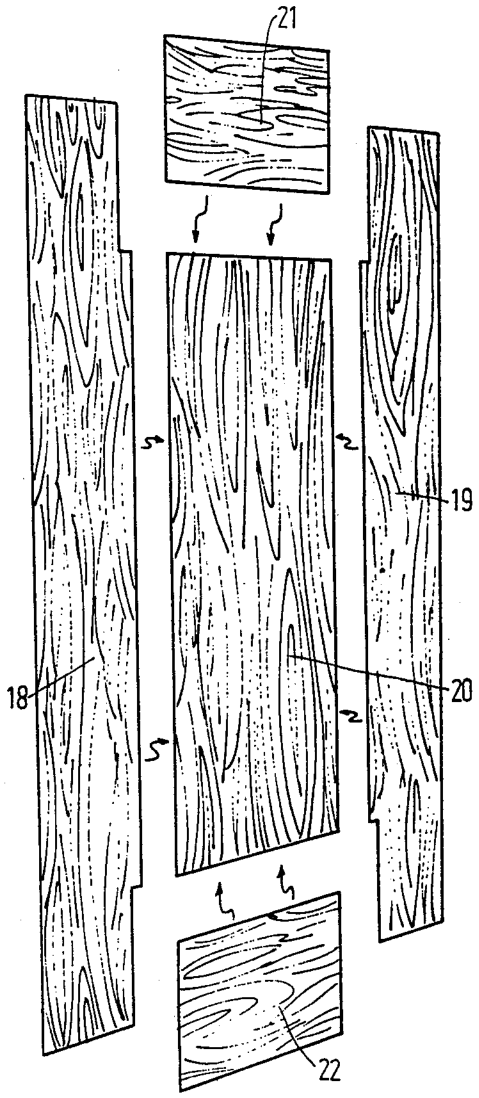
FIG. 6 is an exploded perspective view of the veneer elements for use in the method according to the invention.
Figure 7:
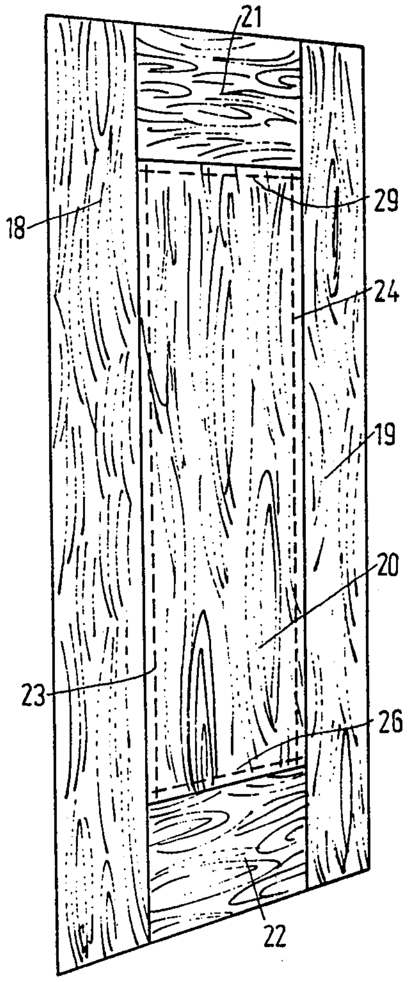
FIG. 7 is a view of the veneer elements of FIG. 6 of the drawings in an overlapping condition, prior to the bonding operation.

A plurality of veneer elements 18,19,20,21 and 22 with visible grain patterns are shown in FIG. 6 of the drawings. In order to produce a simulated framed solid wood furniture panel, the veneer elements 18,19 and 20 have their veneer grain pattern in a direction transverse to the direction of the veneer grain pattern of the veneer elements 21 and 22. As will be observed from FIG. 7 of the drawings, the veneer elements 18, 19,21 and 22 are positioned so that their edges overlap those of the element 20, which overlap is indicated by the dotted lines 23,24,25 and 26 of FIG. 7.

Essentially, therefore, the veneer element 20 is positioned so that its peripheral edges are over the relevant complementary edges of the veneer elements 18,19,21 and 22. The degree of overlap should be such that following bonding of the veneer elements 18,19,20, 21 and 22 to the panel element 10, there is still a small but significant overlap. It will be noted that there is no overlap but edge to edge abutment between the veneer elements 18 and 21,22 and 19 and 21,22.

To manufacture a completed panel 40, suitable adhesive is applied to one side of each veneer element 18,19,20,21 and 22 and the elements 18,19,20,21 and 22 are then placed, adhesive side down, on the panel element 10 in the overlapping manner described above. Using any conventional bonding technique, the veneer elements 18,19,20,21 and 22 are intimately bonded to the panel element 10 to form the panel 40.

Where the right hand edge of the veneer element 18 abuts the veneer elements 21,22 and where the left hand edge of the veneer element 19 abuts the veneer elements 21,22, lines 27,28,29 and 30 are generated. The lines 27,28,29 and 30 enhance the effect that the panel 40 is made from jointed conventional solid wood frame components with a solid wood infill panel. This effect is further enhanced by the transverse orientation of the grain of the veneer elements 18,19,20,21 and 22 described above.

Figure 4:
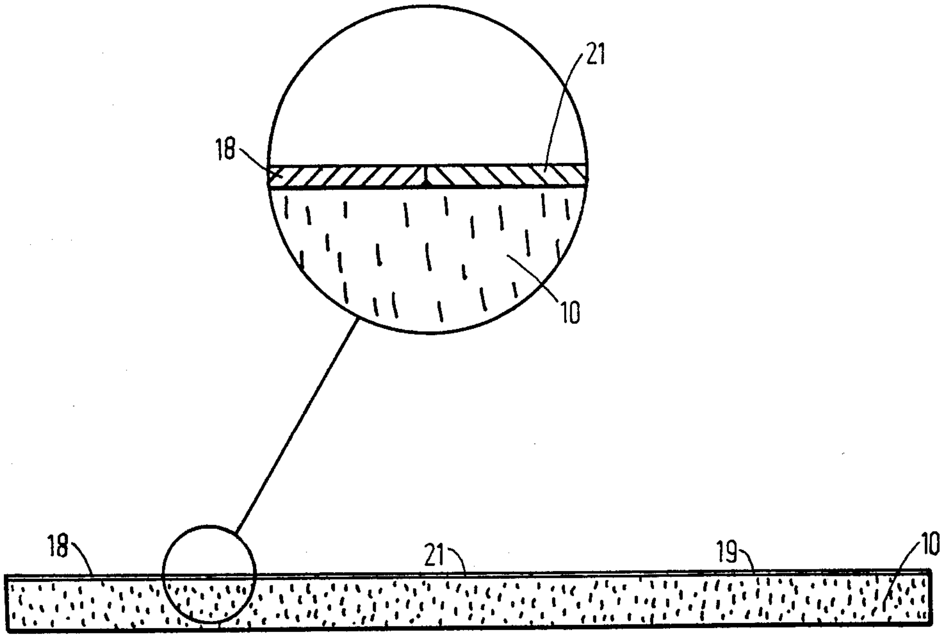
FIG. 4 is a cross-sectional view of the panel of FIG. 3 of the drawings taken along the line IV—IV and viewed in the direction of the associated arrows.
Figure 5:
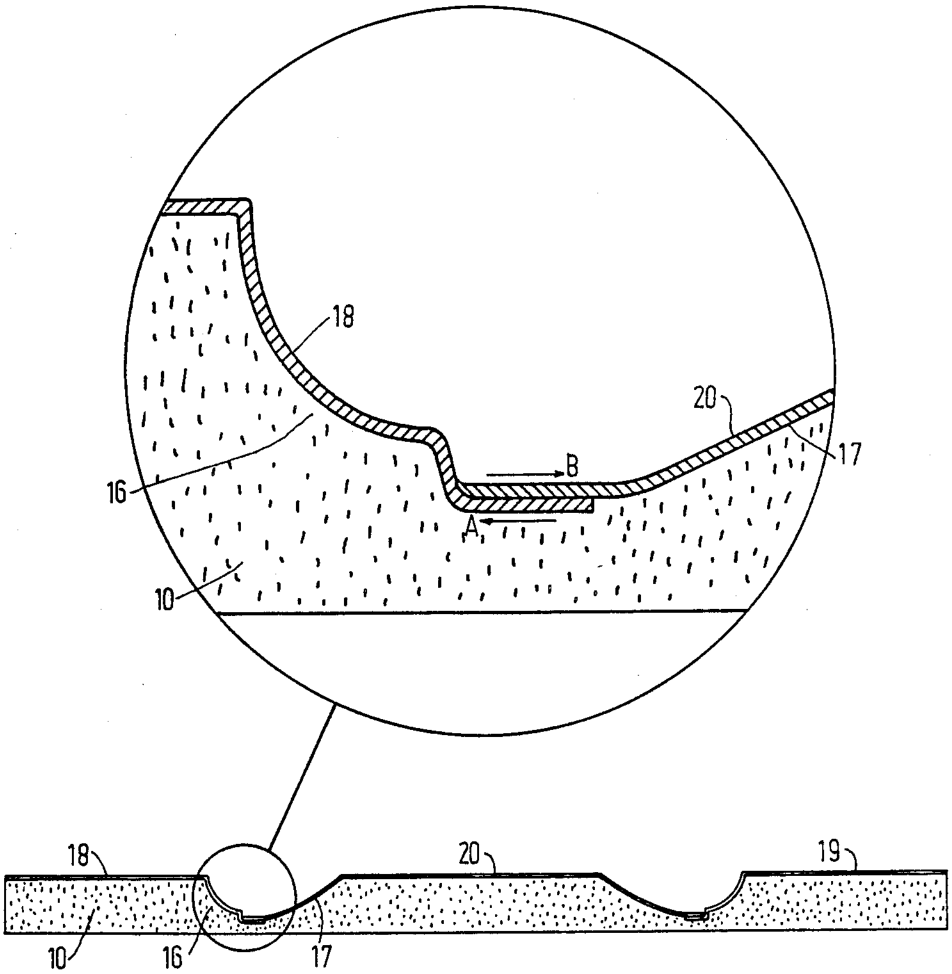
FIG. 5 is a cross-sectional view of the panel of FIG. 3, of the drawings taken along the line V—V and viewed in the direction of the associated arrows.

It will be appreciated that the enlargements of part of FIGS. 4 and 5 of the drawings are exaggerated. In practice, the bonding process will compress the veneer elements 18,19,20,21 and 22 to the extent as to be virtually without thickness when compared with the thickness of the panel element 10. The relatively soft substrate is capable of absorbing any uneveness caused by overlapping of the veneer elements.

The step of producing the ogee moldings 16 and 17 may, as an alternative to routing, be made using the compression moulding or embossing techniques associated with the apparatus disclosed and described in European Patent Specification No. 0 110 708 (Gartland). In addition, the step of bonding the veneer elements 18,19,20,21 and 22 to the panel element 10 may conveniently be carried out by the same apparatus.

When one uses for the bonding operation the apparatus described in EP 0 110 708, (Gartland) the veneer elements 18,19,20,21 and 22, by virtue of their overlapping, "float" or move relative to each other as the pressure of the tool of the apparatus (not shown) is applied during bonding. In this connection specific reference is made to FIG. 5 where the arrows A and B respectively indicate the relative sliding movement of the overlapped veneer elements 18 and 20 as the pressure is applied during the bonding operation. This allows one to use an increased depth in the recess 15 or design area over known conventional veneer panel constructions, as the veneer elements 18,19,20,21 and 22 are not restricted by the stretch properties thereof. In addition, the recess 15 or design area can have a sharper profile. This means in practice that the use of relatively difficult-to-work with veneer elements 18,19,20,21 and 22 is now a practical proposition.

As an alternative to applying adhesive to the, in use, rear surfaces of the veneer elements 18,19,20,21 and 22 prior to bonding the veneer elements to the panel element 10, it is envisaged that one may apply to the relevant surfaces of the panel element 10 an adhesive film and a strip of adhesive film to the, in use, rear surface of the portions of the veneer element 20 which overlap the other veneer elements 18,19,20,21 and 22.

The panel 40 may be used in the construction of doors adpated for use on, for example, kitchen units. The overlapping of the veneer elements 18,19,20,21 and 22 provide for a complete covering of the panel element 10 and thus, due to the absence of grooves and joints associated with framed assembly panels, the problems associated with dirt and moisture penetrating such grooves and joints is eliminated.

I claim:

1. A method for producing a simulated framed solid wood panel member comprising the steps of:

(i) providing a one piece panel element comprising a low grade wood, chip board or medium density fiber board;

(ii) routing, compression molding or embossing the panel element so as to remove the relatively hard outer layer of the panel element thereby exposing the relatively soft substrate thereof;

(iii) selectively recessing the exposed surface of the panel element to produce a decorative shape therein;

(iv) covering the exposed surface with a plurality of veneer elements, each veneer element having a visible grain pattern and at least some of the veneer elements being oriented with their grain patterns at an angle to the grain patterns of immediately adjacent veneer elements;

(v) applying an adhesive between the veneer elements and the exposed surface; and (vi) pressing the veneer elements into intimate contact with the panel element using a compression molding or embossing apparatus to form the panel member, whereby visible lines between adjacent bonded veneer elements simulate the appearance of joints between solid wood components.

2. A method as claimed in claim 1 wherein the decorative shape includes at least one continuous depression.

3. A method as claimed in claim 2 wherein the panel element is substantially rectangular, and the said depression is also substantially rectangular with its edges in parallel spaced apart relationship relative to respective edges of the panel element.

4. A method as claimed in claim 3 wherein the depression has chamfered sides.

5. A method as claimed in claim 1 wherein at least some of the veneer elements overlap in a decorative shape.

6. A method for producing a simulated frame solid wood panel member comprising the steps of:

(i) providing a one piece panel element comprising a low grade wood, chip board or medium density fiber board;

(ii) routing, compression molding or embossing the panel element so as to remove the relatively hard outer layer of the panel element thereby exposing the relatively soft substrate thereof;

(iii) selectively recessing the exposed surface of the panel element to produce a decorative shape therein;

(iv) covering the exposed surface with a plurality of veneer elements, each veneer element having a visible grain pattern and at least some of the veneer elements being oriented with their grain patterns at an angle to the grain patterns of immediately adjacent veneer elements and wherein the edges of at least some of said veneer elements overlap in said decorative shape;

(v) applying an adhesive between the veneer elements and the exposed surface;

(vi) pressing the veneer elements into intimate contact with the panel element using a compression molding or embossing apparatus while allowing said edges to move relative to each other; and (vii) removing the compression molding or embossing apparatus from the thus formed panel member whereby visible lines between adjacent bonded veneer elements simulate the appearance of joints between solid wood components.

7. A method as claimed in claim 6 wherein the decorative shape includes at least one continuous depression.

8. A method as claimed in claim 7 wherein the panel element is substantially rectangular, and the said depression is also substantially rectangular with its edges in parallel spaced apart relationship relative to respective edges of the panel element.

9. A method as claimed in claim 8 wherein the depression has chamfered sides.

* * * * *